(12) United States Patent
Minoshima

(10) Patent No.: US 9,338,388 B2
(45) Date of Patent: May 10, 2016

(54) RECORDING APPARATUS

(71) Applicant: CANON KABUSHIKI KAISHA, Tokyo (JP)

(72) Inventor: Toshio Minoshima, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/960,160

(22) Filed: Aug. 6, 2013

(65) Prior Publication Data
US 2014/0044414 A1 Feb. 13, 2014

(30) Foreign Application Priority Data

Aug. 10, 2012 (JP) ................................. 2012-178057

(51) Int. Cl.
*H04N 9/80* (2006.01)
*H04N 5/91* (2006.01)
*H04N 5/77* (2006.01)
*H04N 9/86* (2006.01)
*H04N 21/433* (2011.01)
*G11B 27/031* (2006.01)

(52) U.S. Cl.
CPC ................ *H04N 5/91* (2013.01); *G11B 27/031* (2013.01); *H04N 5/77* (2013.01); *H04N 9/86* (2013.01); *H04N 21/4334* (2013.01)

(58) Field of Classification Search
CPC .................................................... H04N 21/235
USPC ......................................................... 386/241
See application file for complete search history.

(56) References Cited

U.S. PATENT DOCUMENTS

| 2005/0069296 A1* | 3/2005 | Yoshida | G11B 27/034 386/289 |
|---|---|---|---|
| 2007/0297757 A1* | 12/2007 | Kauffman et al. | 386/55 |
| 2010/0266263 A1* | 10/2010 | Murakami | 386/113 |

FOREIGN PATENT DOCUMENTS

| JP | 2003-61041 A | 2/2003 |
| JP | 2005-236345 A | 9/2005 |
| JP | 2008-252260 A | 10/2008 |
| JP | 2009-239381 A | 10/2009 |
| JP | 2009-260748 A | 11/2009 |

* cited by examiner

*Primary Examiner* — Hung Dang
*Assistant Examiner* — Girumsew Wendmagegn
(74) *Attorney, Agent, or Firm* — Canon U.S.A., Inc. IP Division

(57) ABSTRACT

A recording apparatus includes a generation unit configured to generate first moving image data and second moving image data corresponding to the first moving image data and having a smaller amount of data than that of the first moving image data, an output unit configured to output the moving image data, a recording unit configured to record the moving image data on a recording medium, and a control unit configured to generate identification information for identifying the second moving image data and to control the recording unit to add the identification information to the second moving image data and record the resultant second moving image data on the recording medium, wherein the control unit controls the output unit to add the identification information of the second moving image data corresponding to the first moving image data to the first moving image data and output the resultant first moving image data.

8 Claims, 14 Drawing Sheets

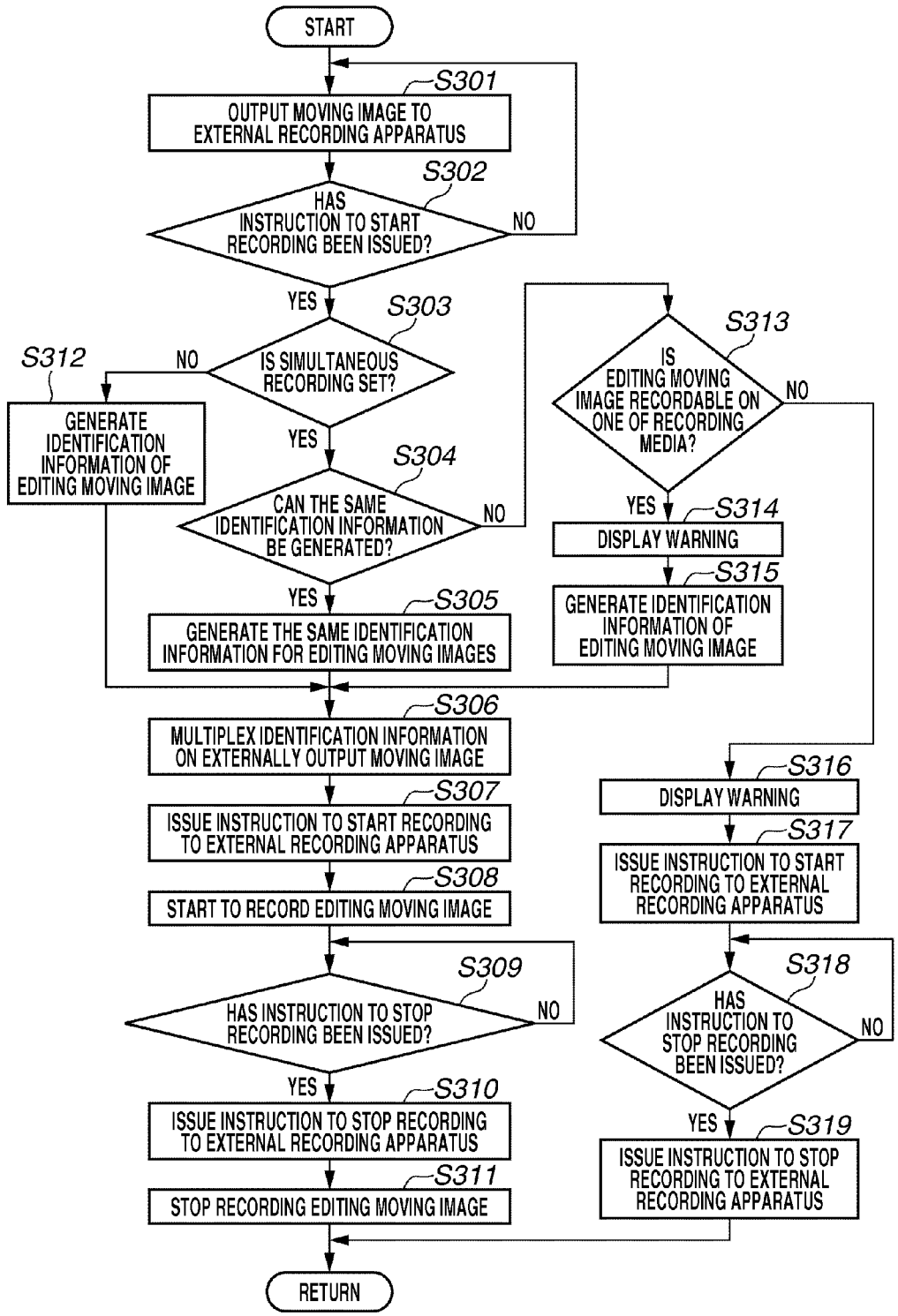

FIG.4A

| RECORDING MEDIUM | MAXIMUM NUMBER OF RECORDED FILE | NUMBER OF FILE TO BE NEXT RECORDED | |
| --- | --- | --- | --- |
| | | NORMAL MODE | EXTERNAL OUTPUT MODE |
| RECORDING MEDIUM A | 0010 | 0011 | 0016 |
| RECORDING MEDIUM B | 0015 | 0016 | 0016 |

FIG.4B

| RECORDING MEDIUM | MAXIMUM NUMBER OF RECORDED FILE | NUMBER OF FILE TO BE NEXT RECORDED | |
| --- | --- | --- | --- |
| | | NORMAL MODE | EXTERNAL OUTPUT MODE |
| RECORDING MEDIUM A | 0010 | 0011 | 0011 |
| RECORDING MEDIUM B | 9999 | INHIBIT RECORDING | INHIBIT RECORDING |

FIG.4C

| RECORDING MEDIUM | MAXIMUM NUMBER OF RECORDED FILE | NUMBER OF FILE TO BE NEXT RECORDED | |
| --- | --- | --- | --- |
| | | NORMAL MODE | EXTERNAL OUTPUT MODE |
| RECORDING MEDIUM A | 9999 | INHIBIT RECORDING | INHIBIT RECORDING |
| RECORDING MEDIUM B | 9999 | INHIBIT RECORDING | INHIBIT RECORDING |

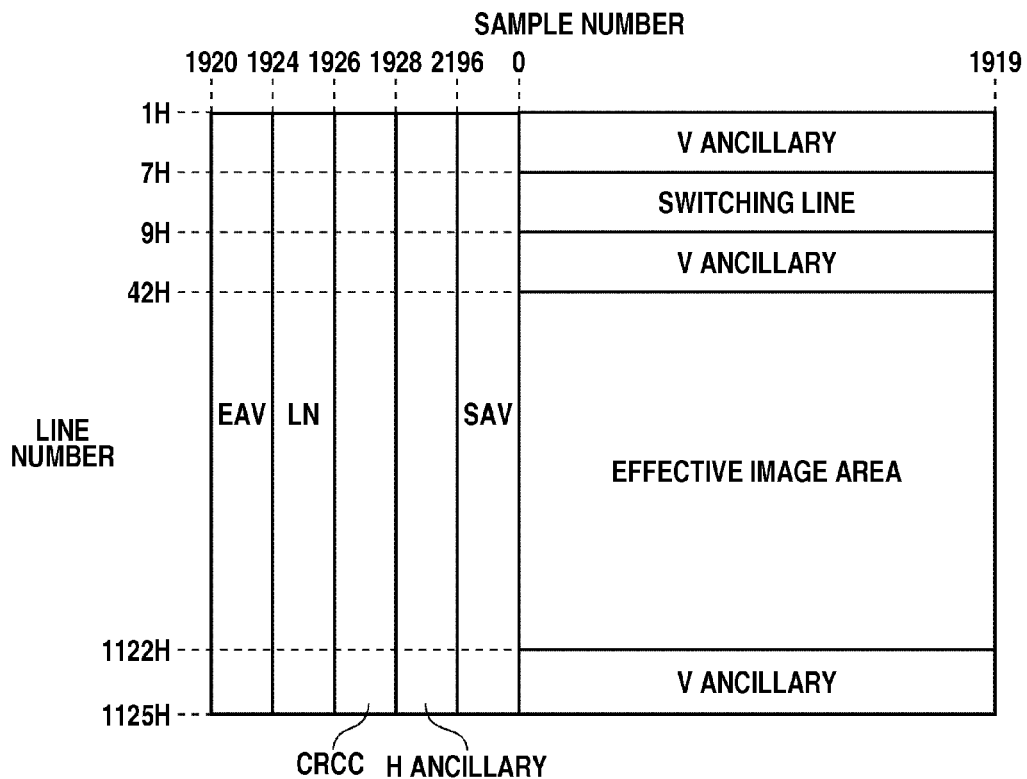

FIG.7

| OUTPUT SIGNAL | FRAME RATE | NUMBER OF CHANNELS | | | |
|---|---|---|---|---|---|
| | | SD-SDI | HD-SDI | Dual Link SDI | 3G SDI |
| 4K (4096×2160) | 59.94P | UNUSABLE | UNUSABLE | 4 | 2 |
| | 50.00P | | | | |
| | 29.97P | | | 2 | 1 |
| | 25.00P | | | | |
| | 24.00P | | | | |
| | 23.98P | | | | |
| HD (1920×1080) | 59.94P | UNUSABLE | 1 | 1 | 1 |
| | 50.00P | | | | |
| | 29.97P | | | | |
| | 25.00P | | | | |
| | 24.00P | | | | |
| | 23.98P | | | | |
| SD (720×480) | 59.94P | 1 | 1 | 1 | 1 |
| | 50.00P | | | | |
| | 29.97P | | | | |
| | 25.00P | | | | |
| | 24.00P | | | | |
| | 23.98P | | | | |

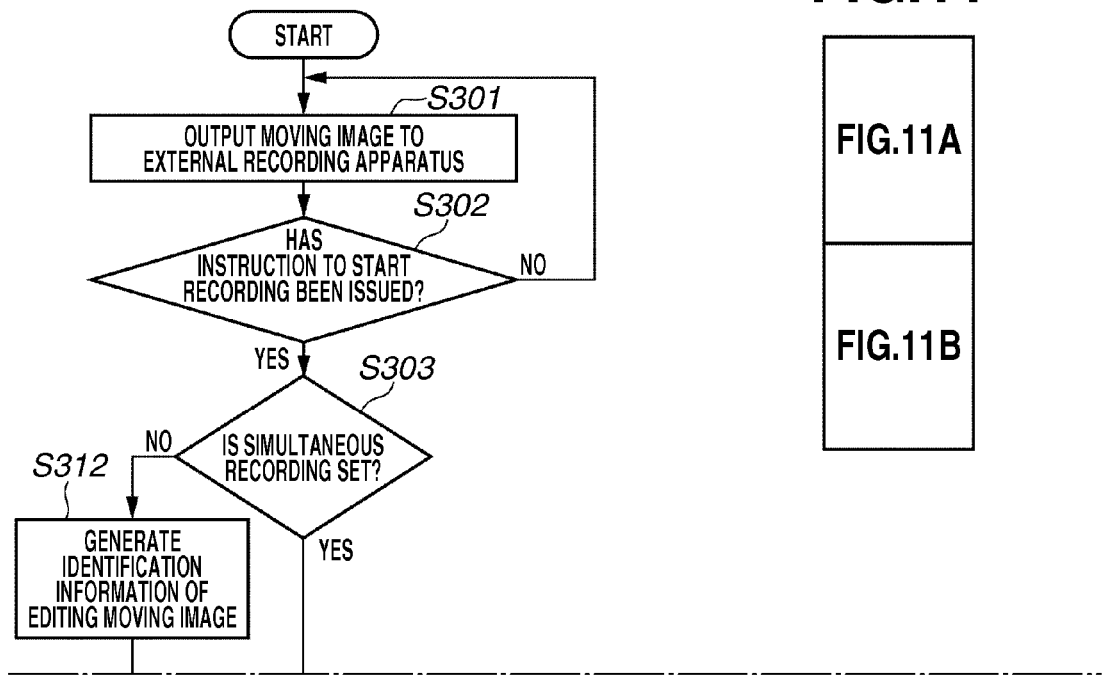

FIG.12A

| RECORDING MEDIUM | MAXIMUM NUMBER OF RECORDED FILE | NUMBER OF FILE TO BE NEXT RECORDED | |
| --- | --- | --- | --- |
| | | NORMAL MODE | EXTERNAL OUTPUT MODE |
| RECORDING MEDIUM A | 0010 | 0011 | 0021 |
| RECORDING MEDIUM B | 0015 | 0016 | 0021 |
| RECORDING MEDIUM C | 0020 | 0021 | 0021 |

FIG.12B

| RECORDING MEDIUM | MAXIMUM NUMBER OF RECORDED FILE | NUMBER OF FILE TO BE NEXT RECORDED | |
| --- | --- | --- | --- |
| | | NORMAL MODE | EXTERNAL OUTPUT MODE |
| RECORDING MEDIUM A | 0010 | 0011 | 0016 |
| RECORDING MEDIUM B | 0015 | 0016 | 0016 |
| RECORDING MEDIUM C | 9999 | INHIBIT RECORDING | INHIBIT RECORDING |

FIG.12C

| RECORDING MEDIUM | MAXIMUM NUMBER OF RECORDED FILE | NUMBER OF FILE TO BE NEXT RECORDED | |
| --- | --- | --- | --- |
| | | NORMAL MODE | EXTERNAL OUTPUT MODE |
| RECORDING MEDIUM A | 9999 | INHIBIT RECORDING | INHIBIT RECORDING |
| RECORDING MEDIUM B | 9999 | INHIBIT RECORDING | INHIBIT RECORDING |
| RECORDING MEDIUM C | 9999 | INHIBIT RECORDING | INHIBIT RECORDING |

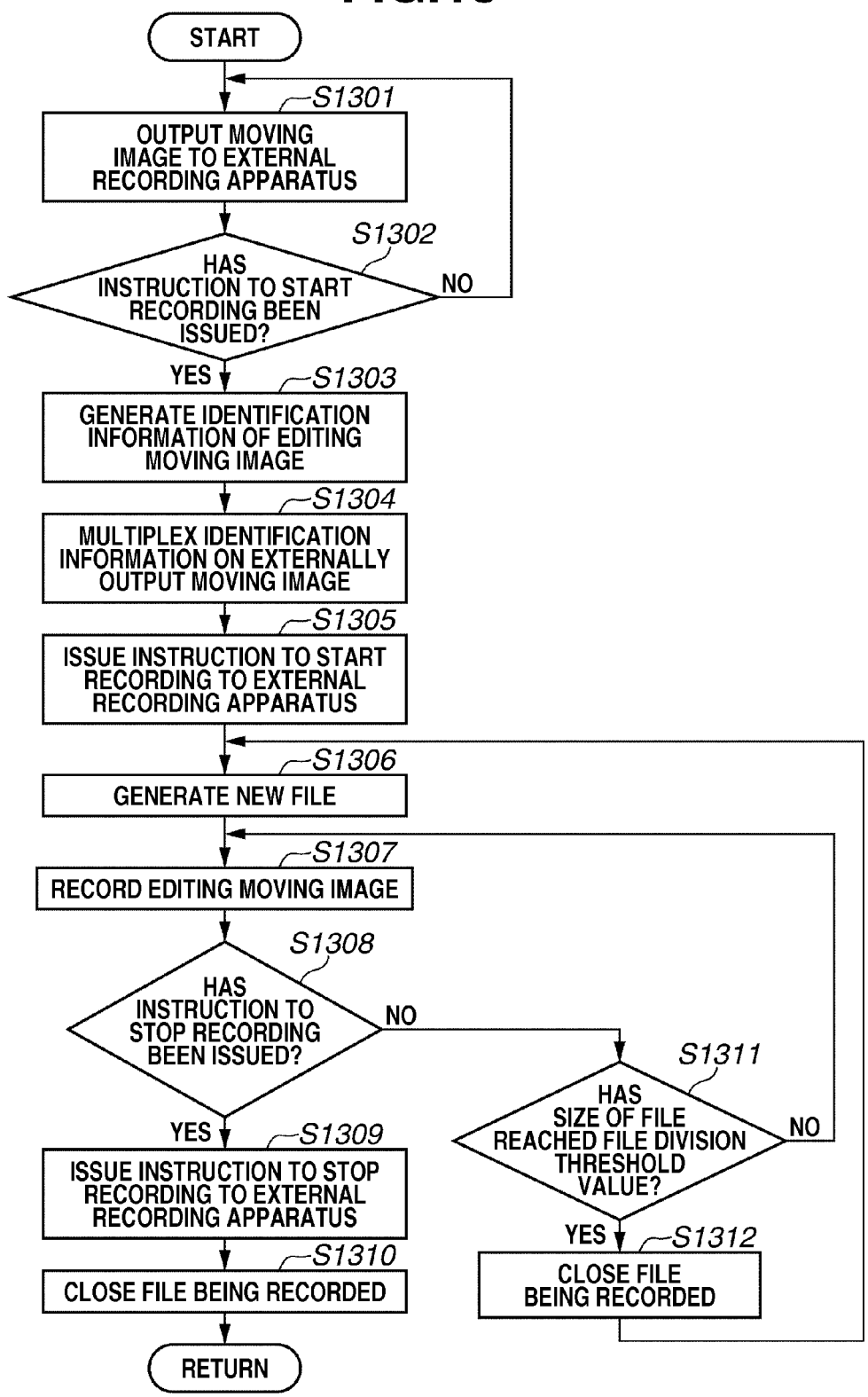

RECORDING APPARATUS

BACKGROUND OF THE INVENTION

1. Field of the Invention

The present invention relates to a recording apparatus.

2. Description of the Related Art

Conventionally, a moving image to be edited has been edited, for example, divided or coupled, after preparing an editing moving image having an amount of information, e.g., a number of pixels or a frame rate, smaller than that of the moving image to be edited and determining an editing point using the editing moving image, based on the editing point (see, e.g., Japanese Patent Application Laid-Open No. 2003-61041). The editing moving image is also referred to as a proxy.

When the proxy is generated, the original moving image to be edited is decoded once, is subjected to processing for reducing a screen size, and is then compressed or coded again. Therefore, it takes a considerable amount of time to generate the proxy.

Further, a moving image can be simultaneously recoded on a plurality of recording media, and the recording media can also be respectively edited using separate editing systems. In this case, the proxy also needs to be generated in each of the editing systems. Therefore, it takes a considerable amount of time and labor.

Therefore, when the moving image is recorded, the proxy can be simultaneously generated and recorded on the recording medium different from that having the moving image recorded thereon, and the proxy recorded on the recording medium can be edited later in an editing apparatus. However, in that case, the moving image to be edited, which corresponds to the editing moving image, may not be easily found.

SUMMARY OF THE INVENTION

The present invention is directed to a recording apparatus capable of facilitating easy finding of a moving image to be edited, which corresponds to an editing moving image.

According to an aspect of the present invention, a recording apparatus includes a generation unit configured to generate first moving image data and second moving image data corresponding to the first moving image data and having a smaller amount of data than that of the first moving image data, an output unit configured to output the moving image data generated by the generation unit, a recording unit configured to record the moving image data generated by the generation unit on a recording medium, and a control unit configured to generate identification information for identifying the second moving image data and to control the recording unit to add the identification information to the second moving image data and record the second moving image data having the identification information added thereto on the recording medium, wherein the control unit controls the output unit to add the identification information of the second moving image data corresponding to the first moving image data to the first moving image data and output the first moving image data having the identification information added thereto.

Further features of the present invention will become apparent from the following description of exemplary embodiments with reference to the attached drawings.

BRIEF DESCRIPTION OF THE DRAWINGS

FIG. 3 is a flowchart illustrating an operation in an external output mode.

FIGS. 4A, 4B, and 4C respectively illustrate file numbers added to a moving image file to be recorded on a recording medium.

FIGS. 5A, 5B, and 5C illustrate a configuration of moving image data having a Serial Digital Interface (SDI) format to be output and respective positions of a command and identification information to be multiplexed with the moving image data.

FIG. 7 illustrates a relationship between the moving image data to be output and the SDI format thereof and the number of output channels.

FIGS. 12A, 12B, and 12C respectively illustrate file numbers added to a moving image file to be recorded on a recording medium.

FIG. 13 is a flowchart illustrating an operation in an external output mode in a third exemplary embodiment.

DESCRIPTION OF THE EMBODIMENTS

Various exemplary embodiments, features, and aspects of the invention will be described in detail below with reference to the drawings.

Figure 1:
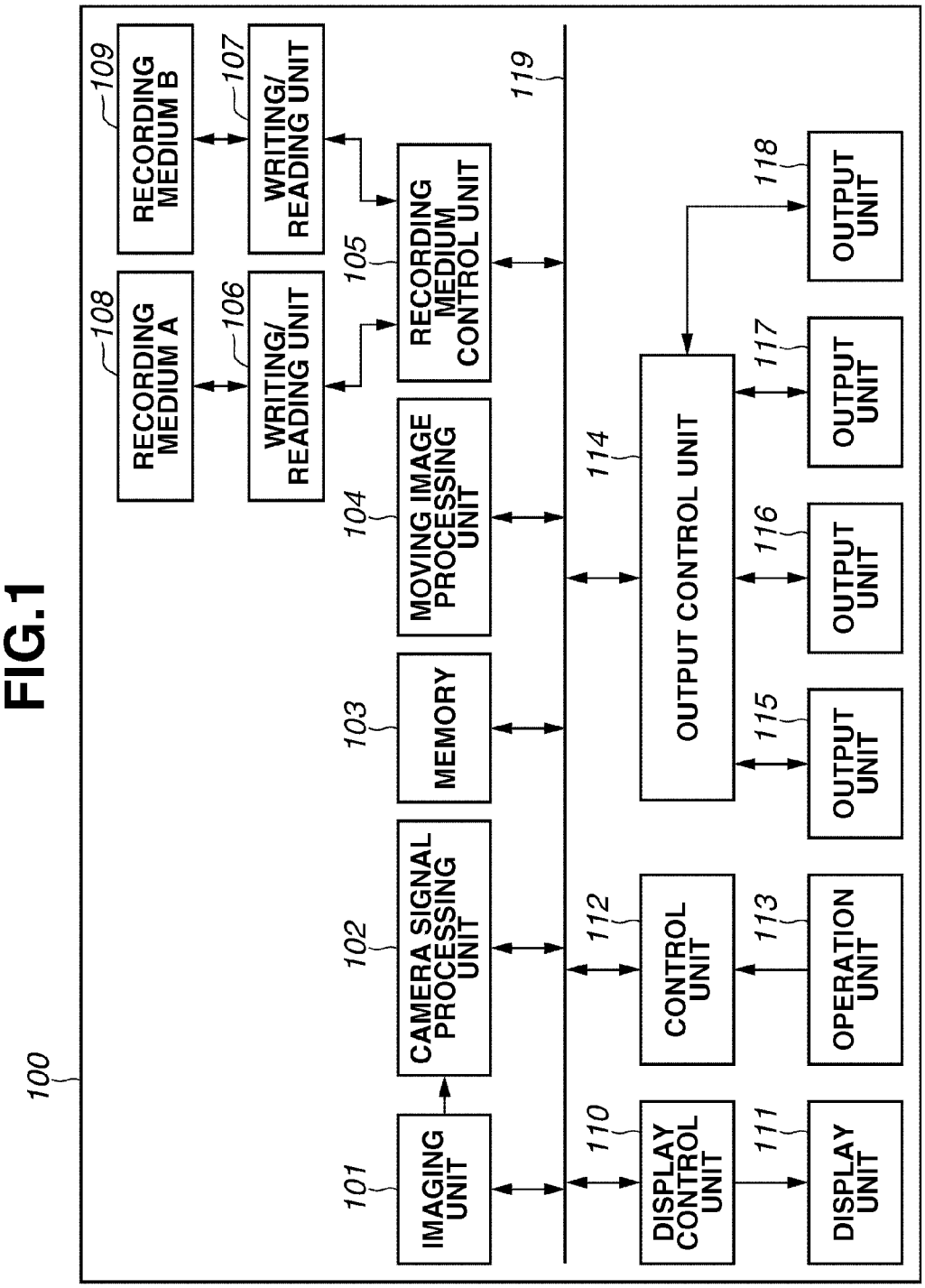
FIG. 1 illustrates a configuration of a recording apparatus according to a first exemplary embodiment.

FIG. 1 is a block diagram illustrating an example of a configuration of a recording apparatus 100 according to a first exemplary embodiment.

In FIG. 1, an imaging unit 101 includes an optical system including a lens, a diaphragm, and a shutter and an image sensor such as a charge-coupled device (CCD) sensor or a complementary metal-oxide semiconductor (CMOS) sensor, and captures an object image and outputs moving image data. The imaging unit 101 acquires and outputs moving image data and audio data. In the present exemplary embodiment, the imaging unit 101 can output moving image data having 4096 pixels in width×2160 pixels in height on one picture and having a rate of 60 frames per second. A camera signal processing unit 102 subjects the moving image data from the imaging unit 101 to necessary processing. A memory 103 stores the moving image data and other data. Each of blocks in the recording apparatus 100 accesses the memory 103, to perform necessary processing. The memory 103 stores various types of information such as information about a file system and management information in addition to the moving image data, and further serves as a work memory for control by a control unit 112. The memory 103 serves as a buffer memory during recording and during reproduction of the data.

A moving image processing unit 104 converts the number of pixels of the input moving image data. The moving image processing unit 104 codes the moving image data to be recorded by known coding such as a Moving Picture Experts Group (MPEG), and compresses an amount of information. The moving image processing unit 104 outputs the moving image data to an external recording apparatus 200 by converting the moving image data according to an output format set by a user, as described below. The moving image processing unit 104 decodes the reproduced moving image data during reproduction.

A recording medium control unit 105 outputs an instruction to write and read data into and out of writing/reading units 106 and 107. The recording medium control unit 105 outputs data to be recorded to the writing/reading units 106 and 107, and receives reproduced data from the writing/reading units 106 and 107. The recording medium control unit 105 receives detection results as to whether a recording medium A 108 and a recording medium B 109 are mounted and information about remaining recording capacities of the recording media 108 and 109, respectively, from the writing/reading units 106 and 107.

The writing/reading units 106 and 107 respectively write and read the moving image data and the various types of information into and out of the recording media 108 and 109. The writing/reading units 106 and 107 record the moving image data to the recording media 108 and 109 during recording. The writing/reading units 106 and 107 respectively read the moving image data out of the recording media 108 and 109 and send the read moving image data to the recording medium control unit 105 during reproduction. In the present exemplary embodiment, the recording media 108 and 109 are configured as separate recording media that are independent from each other, and are each a randomly accessible recording medium such as a hard disk (HDD) or a flash memory card.

The recording medium control unit 105 manages the moving image data and the various types of information to be recorded on the recording media 108 and 109 as moving image files according to a file system such as a File Allocation Table (FAT). The recording medium control unit 105 includes a known interface (IF) such as an AT Attachment (ATA) IF, and communicates data and various types of commands with a recording medium IF in the control unit 112. While the recording medium A 108 and the recording medium B 109 can easily be mounted on and discharged from the recording apparatus 100 by mounting and discharge mechanisms (not illustrated), each of or either one of the recording media 108 and 109 may be contained in the recording apparatus 100. A display control unit 110 displays an image and other information on a display unit 111. The display unit 111 includes a liquid crystal display or an organic electroluminescence (EL) device.

The control unit 112 controls the entire operation of the recording apparatus 100 in response to input from an operation unit 113. The control unit 112 includes a microcomputer and a memory (not illustrated), and controls the recording apparatus 100 according to a program stored in the memory. The control unit 112 contains a recording medium interface for communicating data and a command with the recording medium control unit 105. The operation unit 113 includes various types of switches that are operable by the user. The operation unit 113 receives various types of instructions issued by the user, and notifies the received instructions to the control unit 112. The operation unit 113 includes a power switch, a switch for issuing an instruction to start or stop recording, and a switch for switching a mode of the recording apparatus 100.

The control unit 112 controls, when a moving image file is written into and read out of the recording media 108 and 109, the recording medium control unit 105 to read file system data (management data) out of the recording media 108 and 109, and to store the read file system data in the memory 103. The file system data is data representing a file name and a file size of the moving image file recorded on the recording media 108 and 109 and a recording address of the moving image file and management information for managing the moving image file. The control unit 112 controls writing and reading of the moving image file according to the read file system data. The control unit 112 updates the file system data stored in the memory 103 according to the writing of the moving image file into the recording media 108 and 109. The recording medium control unit 105 records the updated file system data on the recording media 108 and 109. The control unit 112 generates, when moving image files are recorded, a file name (file number) of each of the moving image files, and sends the generated file name to the recording medium control unit 105. The control unit 112 determines, when a moving image file is newly recorded, a number of the moving image file to be newly recorded based on numbers added to one or more moving image files recorded on a recording medium at a recording destination. The control unit 112 adds, out of numbers added to all moving image files recorded on the recording medium at the recording destination, a value obtained by adding a predetermined value, e.g., one, to the maximum number as the number of the moving image file to be newly recorded.

An output control unit 114 uses output units 115 to 118 as a plurality of output systems (channels), to output the moving image data to the external recording apparatus 200. The output control unit 114 outputs the moving image data to the output units 115 to 118 after converting its format into a format suitable for a predetermined format. In the present exemplary embodiment, each of the output units 115 to 118 outputs the moving image data in a format conforming to the Serial Digital Interface (SDI) standard defined by the Society of Motion Picture and Television engineers (SMPTE). Therefore, the output control unit 114 outputs the moving image data after converting its format into a format suitable for the SDI format. Each of the output units 115 to 118 outputs the moving image data received from the output control unit 114. Each of the output units 115 to 118 includes a connection unit such as a Bayonet Neill Concelman (BNC) connector. A data bus 119 transfers data to and from each of the units.

Normal recording processing in the recording apparatus 100 will be described below. In the present exemplary embodiment, the user can select any one of three types of pixel arrays, i.e., 4096 pixels in width×2160 pixels in height, 1920 pixels in width×1080 pixels in height, and 720 pixels in width×480 pixels in height as the number of pixels per frame of the moving image data to be recorded. In the present exemplary embodiment, moving image data having 4096 pixels in width×2160 pixels in height per frame is referred to as 4K, moving image data having 1920 pixels in width×1080 pixels in height per frame is referred to as HD, and moving image data having 720 pixels in width×480 pixels in height per frame is referred to as SD. The user can select any one of 59.94 frames/second (fps), 50 fps, 29.97 fps, 25 fps, 24 fps, and 23.98 fps as a frame rate (a number of frames per unit time) of the moving image data to be recorded. The user operates the operation unit 113, to select the number of pixels and the frame rate of the moving image data to be recorded. The number of pixels and the frame rate of the moving image data can also be other values.

The control unit 112 controls each of the units, displays a moving image captured by the imaging unit 101 on the display unit 111, and brings the recording apparatus 100 into a recording standby state when the operation unit 113 turns on power thereto. If an instruction to start recording has been issued from the operation unit 113 in the recording standby state, the control unit 112 instructs the imaging unit 101 and the camera signal processing unit 102 to output moving image data having a designated frame rate. The camera signal processing unit 102 outputs the moving image data of 4K having a designated frame rate, and stores the output moving image data of 4K in the memory 103. The moving image processing unit 104 reads out the moving image data of 4K stored in the memory 103, and converts the number of pixels of the moving image data of 4K into a number of pixels designated by the user. The moving image processing unit 104 codes the moving image data of 4K after the conversion, and stores the coded moving image data in the memory 103.

The control unit 112 instructs the recording medium control unit 105 to start to record the moving image data. The recording medium control unit 105 reads the moving image data out of the memory 103, and records the read moving image data on one of the recording media 108 and 109 by outputting the moving image data to corresponding one of the writing/reading units 106 and 107. In the present exemplary embodiment, the user operates the operation unit 113, to select one of the recording media 108 and 109. The moving image data is recorded on the selected recording medium. If only one of the recording media 108 and 109 is mounted, the control unit 112 instructs the recording medium control unit 105 to record the moving image data on the mounted recording medium regardless of setting by the user.

The recording medium control unit 105 outputs the moving image data, which has been read out of the memory 103, to either one of the writing/reading units 106 and 107, and instructs the writing/reading unit to write the moving image data according to the instruction from the control unit 112. The writing/reading units 106 and 107 record the received moving image data, respectively, on the recording media 108 and 109. If an instruction to stop recording has been issued from the operation unit 113 after recording is started, the control unit 112 instructs the recording medium control unit 105 to stop recording, to stop recording the moving image data on the recording media 108 and 109. The control unit 112 instructs the moving image processing unit 104 to stop converting the number of pixels and performing coding processing.

Simultaneous recording will be described below. In the present exemplary embodiment, the recording apparatus 100 has a function of simultaneously recording the same moving image data on the two recording media 108 and 109. This function is referred to as a simultaneous recording function.

In the present exemplary embodiment, when both the recording media 108 and 109 are mounted, the user can set the simultaneous recording by operating the operation unit 113. If the simultaneous recording is set, the control unit 112 instructs the recording medium control unit 105 to record the moving image data on both the recording media 108 and 109 in response to the instruction to start recording. The recording medium control unit 105 outputs the moving image data to both the writing/reading units 106 and 107, and instructs both the writing/reading units 106 and 107 to start recording. The writing/reading units 106 and 107 respectively start to record the moving image data on the recording media 108 and 109 in response to the instruction to start recording. If the instruction to stop recording has been issued from the operation unit 113 after recording is started, the control unit 112 instructs the recording medium control unit 105 to stop recording. The recording medium control unit 105 instructs the writing/reading units 106 and 107 to stop recording the moving image data on the recording media 108 and 109. The writing/reading units 106 and 107 stop recording on the recording media 108 and 109 in response to the instruction to stop recording.

An external output mode will be described below. In the present exemplary embodiment, the four output units 115 through 118 output moving image data representing a captured moving image to the external recording apparatus 200 in the external output mode. The external recording apparatus 200 is instructed to start and stop recording in response to the instruction to start recording and the instruction to stop recording by the user so that the external recording apparatus 200 records the output moving image data. The user can set the external output mode by operating the operation unit 113. If the external output mode is set, the user can set the number of pixels and the frame rate of the output moving image data.

The output units 115 through 118 output the moving image data according to the SDI standard. FIGS. 5A, 5B, and 5C represent a relationship between the type and the maximum transmission bit rate of the SDI defined by SMPTE or International Telecommunication Union Radio Communications Sector (ITU-R) and the number of cables to be used. The transmission bit rate is 270 megabits/second (Mbps) in SD-SDI, 1.485 gigabits/second (Gbps) in HD-SDI, and 2.970 Gbps in Dual Link SDI and 3G SDI.

Figure 6:
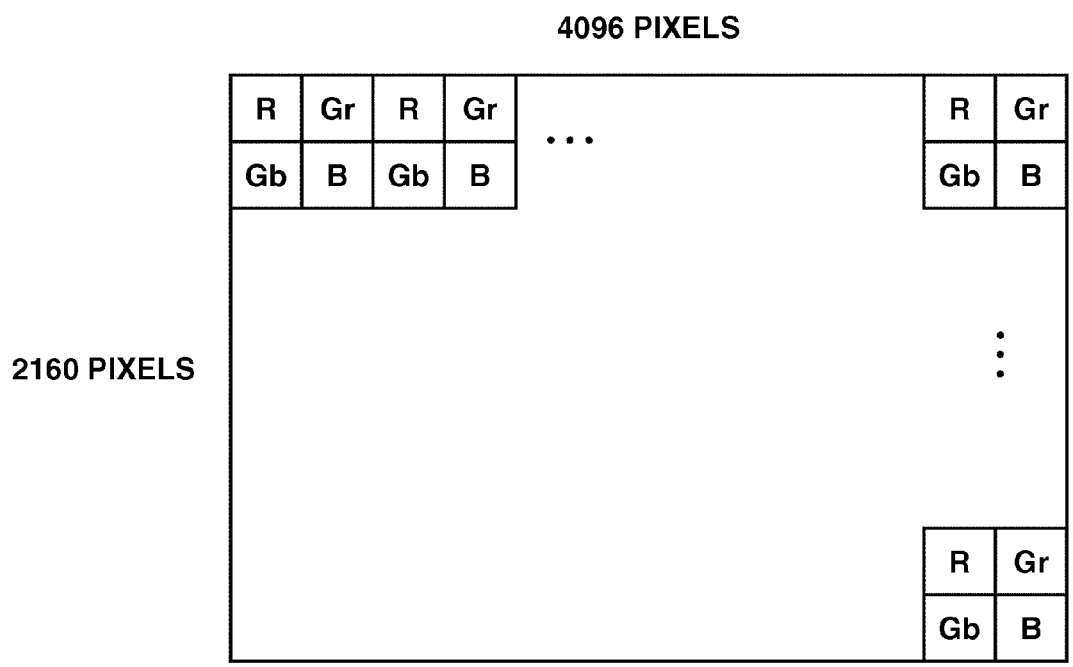
FIG. 6 illustrates a format of moving image data to be output.

FIG. 6 illustrates a pixel array of the moving image data of 4K to be output in the external output mode. In the present exemplary embodiment, the pixel array of the moving image data of 4K is a Bayer array conventionally widely used in an imaging apparatus. In the Bayer array, two types of lines, i.e., lines each having red (R) and green (Gr) alternately arranged therein and lines each having green (Gb) and blue (B) alternately arranged therein are alternately arranged in a vertical direction. Each of the pixels is output as 10-bit data. Therefore, an amount of data per frame is 4096 pixels×2160 pixels× 10 bits=88.47 megabits.

If the frame rate of the moving image data of 4K to be output is 59.94 fps, the bit rate of the moving image data of 4K to be output is 88.47 megabits×59.94=5.303 gigabits/second. Therefore, the moving image data of 4K needs to be divided into two channels when output in 3G SDI. The moving image data of 4K needs to be divided into four channels when output in Dual Link SDI.

If the frame rate of the moving image data of 4K to be output is 29.97 fps, the bit rate of the moving image data of 4K to be output is 88.47 Megabits×29.97=2.651 gigabits/second. Therefore, the moving image data of 4K can be output on one channel when output in 3G SDI. The moving image data of 4K needs to be divided into two channels when output in Dual Link SDI. The moving image data, which has been divided into two channels or four channels when output, can thus be received in the external recording apparatus 200 and recorded as one moving image data.

A relationship between moving image data to be output and the number of channels used to output each of the moving image data is illustrated in FIG. 7. The user can set the number of pixels and the frame rate of the moving image data to be output by operating the operation unit 113, as described above. The user can set the type of the moving image data to be output (the number of pixels and the frame rate) and the type of the SDI used to output the moving image data for each output channel (CH) by operating the operation unit 113. The user can set whether the moving image data is output for each channel by operating the operation unit 113. The output units 115 to 118 illustrated in FIG. 1 respectively correspond to channels 1 to 4. To output the moving image data of 4K having a frame rate of 59.94 fps in 3G SDI, the number of channels in the SDI needs to be two. Therefore, if the user sets the output channel CH1 to 3G SDI, and sets the moving image data to be output to the moving image data of 4K having a frame rate of 59.94 fps in the present exemplary embodiment, for example, the output channel CH2 is automatically set to 3G SDI, and the moving image data to be output is set to the moving image data of 4K having a frame rate of 59.94 fps.

In the present exemplary embodiment, moving image data (first moving image data) is being output while editing moving image data (second moving image data) having a smaller number of pixels than that of the moving image data that is being output is simultaneously generated and recorded on each of the recording media 108 and 109 in the external output mode. If the moving image data of 4K is being externally output, the moving image data HD or the moving image data SD, corresponding to the moving image data of 4K that is being output, is generated in parallel with the output of the moving image data, and is recorded on the recording media 108 and 109. In the external output mode, the editing moving image data can simultaneously be recorded on the two recording media 108 and 109. The user can perform setting so that simultaneous recording of the editing moving image data is performed in the external output mode by operating the operation unit 111. The user may also be able to select which of the moving image data SD and the moving image data HD is to be recorded as the editing moving image data. While the moving image data of 4K is output without being subjected to coding using the MPEG in the external output mode in the present exemplary embodiment, the moving image data HD or SD may be output. In the external output mode, the control unit 112 generates identification information of the editing moving image data to be recorded on the recording media 108 and 109. The output control unit 114 multiplexes the identification information with the moving image data to be output to the external recording apparatus 200, and outputs a multiplexing result.

FIG. 3 is a flowchart illustrating processing performed by the recording apparatus 100 associated with the external output mode. The processing illustrated in FIG. 3 is performed when the control unit 112 controls each of the units in the recording apparatus 100. While the recording apparatus 100 is set to the external output mode, the processing illustrated in FIG. 3 is repeatedly performed.

If the external output mode is set in the recording standby state, then in step S301, the control unit 112 controls each of the units so that moving image data of 4K having a designated frame rate is output from each of the output units 115 to 118. The output control unit 114 outputs each of moving image data from the corresponding channel in response to setting. In step S302, the control unit 112 then determines whether the instruction to start recording has been issued from the operation unit 113.

If the instruction to start recording has been issued (YES in step S302), then in step S303, the control unit 112 determines whether simultaneous recording of the editing moving image data is set. If the simultaneous recording is not set (NO in step S303), then in step S312, the control unit 112 generates the identification information of the editing moving image data. In the present exemplary embodiment, a file number of a moving image file storing the editing moving image data is used as the identification information.

If the simultaneous recording is set (YES in step S303), then in step S304, the control unit 112 confirms whether the same identification information can be generated for the editing moving image data to be simultaneously recorded on the two recording media 108 and 109.

FIGS. 4A to 4C illustrate the identification information of the editing moving image data to be generated by the control unit 112. As described above, in the present exemplary embodiment, the file number (file name) to be added to the moving image file is used as the identification information. In an example illustrated in FIG. 4A, for example, a maximum value of file numbers added to the moving image file, which has already been recorded on the recording medium A 108, is 10, and a maximum value of file numbers added to the moving image file, which has already been recorded on the recording medium B 109, is 15.

Therefore, in a normal recording mode, the control unit 112 adds 11, obtained by adding one to 10, as a file number to a moving image file to be next recorded on the recording medium A 108, and 16, obtained by adding one to 15, is added as a file number to a moving image file to be next recorded on the recording medium B 109. On the other hand, if simultaneous recording is set in the external output mode, the control unit 112 adds the same value as a file number to the moving image files to be recorded on the recording media 108 and 109. In FIG. 4A, for example, 16 obtained by adding one to 15 serving as the maximum value of the file numbers added to the moving image files, which have already been recorded on the recording medium A 108 and the recording medium B 109, is added as a file number.

If the same identification information can thus be generated for the editing moving image data to be recorded on the two recording media 108 and 109 (YES in step S304), then in step S305, the control unit 112 generates the same identification information for the editing moving image data to be recorded on the two recording media 108 and 109, as described above.

In step S306, the control unit 112 then sends the identification information of the editing moving image data to the output control unit 114, and instructs the output control unit 114 to multiplex the identification information with the moving image data output from each of the output units 115 to 118. In step S307, the control unit 112 instructs the output control unit 114 to multiplex command data representing a command to start recording with the moving image data output from each of the output units 115 to 118. The output control unit 114 multiplexes the identification information of the editing moving image data and the command data representing a command to start recording with the output moving image data, and outputs a multiplexing result to each of the output units 115 to 118. In the present exemplary embodiment, the identification information is multiplexed with the moving image data in all frames to be output after the instruction to start recording has been issued.

FIG. 5A illustrates a configuration of the moving image data to be output from each of the output units 115 to 118 in the present exemplary embodiment. In the present exemplary embodiment, the moving image data is output according to the SDI standard. FIG. 5A illustrates moving image data in one frame. The moving image data in one frame includes EAV representing the end of a horizontal line, line length data LN, an error check CRCC, an H ancillary serving as auxiliary data, SAV representing the start of the horizontal line, a V ancillary serving as auxiliary data, and an effective image area. In the present exemplary embodiment, the identification information of the editing moving image data and command data representing a command to start or stop recording are multiplexed on a predetermined horizontal line in the V ancillary. An example of a multiplexing position of the identification information of the editing moving image data is illustrated in FIG. 5B, and an example of a multiplexing position of the command to start or stop recording is illustrated in FIG. 5C.

In step S308, the control unit 112 then starts to record the editing moving image data. If the simultaneous recording is set, the control unit 112 simultaneously records the editing moving image data on the two recording media 108 and 109.

The control unit 112 instructs the recording medium control unit 105 to add the same file number to the moving image files to be recorded on the recording media 108 and 109. In step S309, the control unit 112 then determines whether the instruction to stop recording has been issued from the operation unit 113. If the instruction to stop recording has been issued (YES in step S309), then in step S310, the control unit 112 instructs the output control unit 114 to multiplex the command data representing a command to stop recording with the moving image data output from each of the output units 115 to 118. The output control unit 114 multiplexes the command data representing a command to stop recording with the output moving image data, and outputs a multiplexing result to each of the output units 115 to 118. The control unit 112 instructs the output control unit 114 to stop multiplexing the identification information of the editing moving image data. The output control unit 114 stops multiplexing the identification information on the externally output moving image data, adds invalid data to the multiplexing position of the identification information, and outputs the moving image data having the invalid data added thereto.

In step S311, the control unit 112 then instructs the recording medium control unit 105 to stop recording the editing moving image data. The recording medium control unit 105 instructs the writing/reading units 106 and 107 to stop recording the editing moving image data.

If the same identification information cannot be generated (NO in step S304), then in step S313, the control unit 112 determines whether the editing moving image data can be recorded on either one of the two recording media 108 and 109.

In an example illustrated in FIG. 4B, for example, a maximum value of file numbers added to a moving image file, which has already been recorded on the recording medium B 109, is 9999. In the present exemplary embodiment, an upper limit of a file number is set to 9999. Therefore, a moving image file having a file number exceeding the maximum value added thereto cannot be recorded on the recording medium B 109. Thus, a new moving image file is inhibited from being recorded on the recording medium B 109. On the other hand, a maximum value of file numbers added to a moving image file, which has already been recorded on the recording medium A 108, is 10. Thus, 11 is added as a file number of a moving image file to be next recorded.

As illustrated in FIG. 4B, if the editing moving image data can be recorded on one of the recording media 108 and 109 (YES in step S313), then in step S314, the control unit 112 displays on the display unit 111 information indicating that simultaneous recording is inhibited to record the editing moving image data on one of the recording media, e.g., the recording medium A 108. In step S315, the control unit 112 generates the identification information of the editing moving image data, as described above, based on the file number of the moving image file that has been recorded on the one recording medium.

As illustrated in FIG. 4C, if the maximum value of the file number is an upper-limit value in either of the recording media 108 and 109, the control unit 112 inhibits the editing moving image data from being recorded. In such a case, the control unit 112 determines that the editing moving image data cannot be recorded (NO in step S313), and the processing proceeds to step S316. In step S316, the control unit 112 displays on the display unit 111 warning information indicating that the editing moving image data cannot be recorded.

In step S317, the control unit 112 instructs the output control unit 114 to multiplex the command data representing a command to start recording with the moving image data output from each of the output units 115 to 118. The output control unit 114 multiplexes the identification information of the editing moving image data and the command data representing a command to start recording with the output moving image data, and outputs a multiplexing result to each of the output units 115 to 118.

In step S318, the control unit 112 then determines whether the instruction to stop recording has been issued from the operation unit 113. If the instruction to stop recording has been issued (YES in step S318), then in step S319, the control unit 112 instructs the output control unit 114 to multiplex the command data representing a command to stop recording with the moving image data output from each of the output units 115 to 118. The output control unit 114 multiplexes the command data representing a command to stop recording with the output moving image data, and outputs a multiplexing result to each of the output units 115 to 118.

Figure 2:
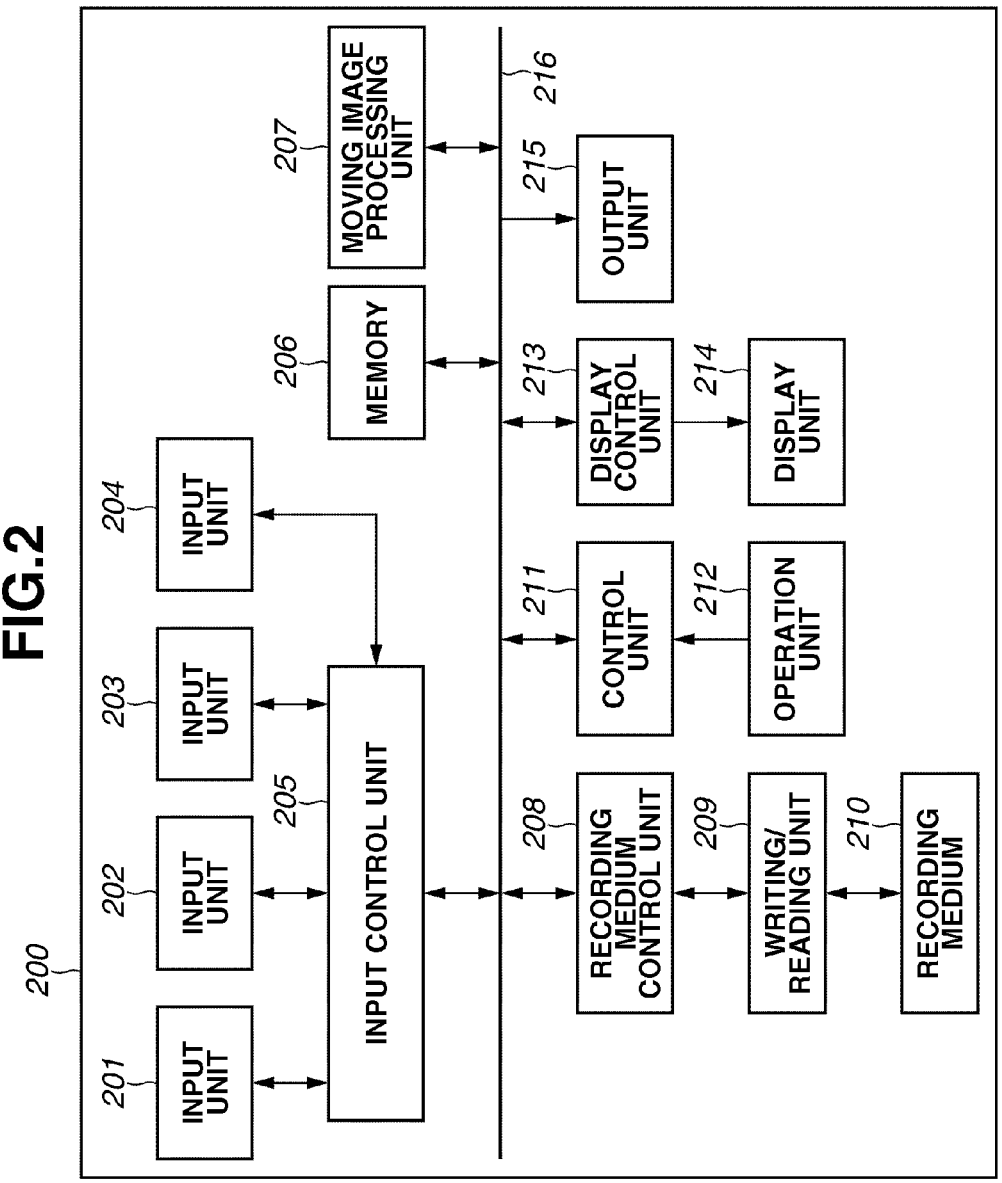
FIG. 2 illustrates a configuration of an external recording apparatus.

An external recording apparatus that receives moving image data output from the recording apparatus 100 and records the received moving image data will be described below. FIG. 2 illustrates a configuration of an external recording apparatus 200. In the present exemplary embodiment, the recording apparatus 100 and the external recording apparatus 200 are connected to each other via a cable conforming to the SDI so that the moving image data is output from the recording apparatus 100 to the external recording apparatus 200.

In FIG. 2, each of input units 201 to 204 inputs the moving image data output from the recording apparatus 100 according to the SDI format. An input control unit 205 inputs the input moving image data and outputs the input moving image data to a memory 206 based on the SDI format of each of the input units 201 to 204 and the type of the moving image data, which are set by a control unit 211.

The memory 206 stores the moving image data and other data. Each of blocks in the recording apparatus 200 accesses the memory 206, to perform necessary processing. The memory 206 stores the various types of information such as the information about the file system and the management information in addition to the moving image data, and further serves as a work memory for control by the control unit 211. The memory 206 serves as a buffer memory during recording and during reproduction of the data.

A moving image processing unit 207 converts the number of pixels of the moving image data. The moving image processing unit 207 decodes, when the recorded moving image data has been coded, reproduced moving image data. The moving image processing unit 207 outputs the reproduced moving image data by converting the moving image data according to an output format set by the user.

A recording medium control unit 208 outputs an instruction to write and read data into and out of a writing/reading unit 209. The recording medium control unit 208 outputs data to be recorded to the writing/reading unit 209, and receives reproduced data from the writing/reading unit 209. The recording medium control unit 208 receives information about a remaining recording capacity of a recording medium 210 from the writing/reading unit 209.

The writing/reading unit 209 writes and reads the moving image data and the various types of information into and out of the recording medium 210. The writing/reading unit 209 records the moving image data on the recording medium 210 during recording. The writing/reading unit 209 reads the moving image data out of the recording medium 210, and sends the read moving image data to the recording medium control unit 208 during reproduction. In the present exemplary embodiment, the recording medium 210 is a random access recording medium such as an HDD or a flash memory card contained in the recording apparatus 200. The recording medium 210 may be easily mounted on and discharged from the recording apparatus 100 using a mounting and discharge mechanism (not illustrated).

The recording medium control unit 208 manages the moving image data and the various types of information to be recorded on the recording medium 210 as moving image files according to a file system such as the FAT. The recording medium control unit 208 includes a known IF such as the ATA IF, and communicates data and various types of commands with the recording medium IF in the control unit 211.

The control unit 211 controls the entire operation of the recording apparatus 200 in response to input from an operation unit 212. The control unit 211 includes a microcomputer and a memory (not illustrated), and controls the recording apparatus 200 according to a program stored in the memory. The control unit 211 contains a recording medium interface for communicating data and a command with the recording medium control unit 208. The operation unit 212 includes various types of switches that are operable by the user. The operation unit 212 receives various types of instructions by the user, and notifies the received instructions to the control unit 211. The operation unit 212 includes a power switch, a switch for issuing an instruction to start or stop recording, and a switch for switching a mode of the recording apparatus 200.

The control unit 211 controls, when the moving image file is written into and read out of the recording medium 210, the recording medium control unit 208, to read file system data (management data) out of the recording medium 210, and to store the read file system data in the memory 206. The file system data is data representing a file name and a file size of the moving image file recorded on the recording medium 210 and a recording address of the moving image file, and management information for managing the moving image file. The control unit 211 controls writing and reading of the moving image file according to the read file system data. The control unit 211 updates the file system data stored in the memory 206 according to the writing of the file into the recording medium 210. The recording medium control unit 208 records the updated file system data on the recording medium 210. A display control unit 213 displays an image and other information on a display unit 214. The display unit 214 includes a liquid crystal display or an organic EL device. An output unit 215 externally outputs the input moving image data and the reproduced moving image data. A bus 216 sends and receives data and a command to and from each of the units.

Figure 8:
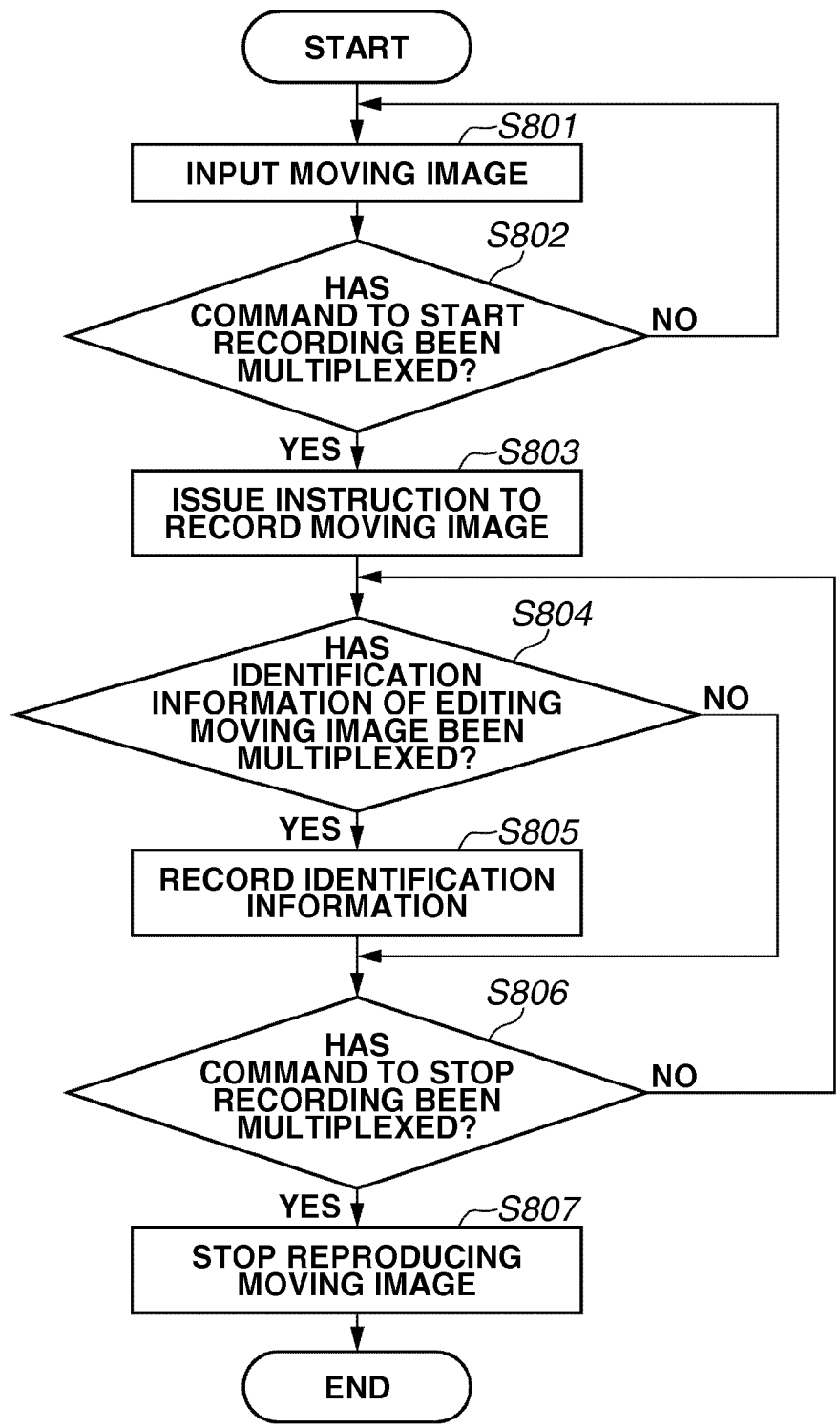
FIG. 8 is a flowchart illustrating a recording operation by the external recording apparatus.

Processing in recording the moving image data input by each of the input units 201 to 204 in the recording apparatus 200 will be described below. FIG. 8 is a flowchart illustrating recording processing by the recording apparatus 200. The processing illustrated in FIG. 8 is performed when the control unit 211 controls each of the units.

The user can set the number of pixels and the frame rate of the moving image data input from each of the input units 201 to 204 and SDI formats in the input units 201 to 204 by operating the operation unit 113. The user can input and record the moving image data output from the recording apparatus 100 by setting each of the input units 201 to 204 according to the number of pixels and the frame rate of the moving image data and the SDI format, which are set in each of the output units 115 to 118 in the recording apparatus 100.

The user turns on power to the recording apparatus 200, then connects the output units 115 to 118 in the recording apparatus 100 and the input units 201 to 204 via a cable conforming to the SDI format, and sets the moving image data and the SDI format to be input by each of the input units 100, as described above. In step S801, the control unit 211 inputs the moving image data to each of the input units 201 to 204 from the recording apparatus 100 when the recording apparatus 100 is set to the external output mode.

In step S802, the control unit 211 checks a V ancillary of each of frames constituting the moving image data input from each of the input units 201 to 204 in the recording standby state, and determines whether a command to start recording has been multiplexed with the V ancillary. If the command to start recording has been multiplexed with the V ancillary (YES in step S802), then in step S803, the control unit 211 instructs the recording medium control unit 208 to record the moving image data input from each of the input units 201 to 204. The recording medium control unit 208 controls the writing/reading unit 209, to record the input moving image data on the recording medium 210. At this time, in the present exemplary embodiment, the moving image data on a plurality of channels input from the input units 201 to 204 are collectively recorded. If the input moving image data is not easy to handle because the size thereof is large, the frames constituting the input moving image data can also be recorded as one file. More specifically, the frames constituting the input moving image data can also be recorded as one moving image file including data in one frame illustrated in FIG. 5A. In this case, the control unit 211 records files constituting one clip, which have been recorded since the command to start recording was detected until a command to stop recording is detected, by adding information for managing the moving image files as one moving image data to the management information.

In step S804, the control unit 211 then determines whether the identification information of the editing moving image data has been multiplexed with the V ancillary of the input moving image data. If the identification information has been multiplexed (YES in step S804), the control unit 211 sends the identification information to the recording medium control unit 208. In step S805, the control unit 112 stores the identification information in the management information, and instructs the recording medium control unit 208 to record the identification information to match the recorded moving image data. The recording medium control unit 208 stores the identification information in the management information, and records the identification information to match the moving image data. If the frames constituting the moving image data are recorded as one moving image file, as described above, the recording medium control unit 208 records the identification information to match each of the moving image files. If the frames are recorded as one moving image file, ancillary data in the frame is directly recorded so that the identification information may not be stored in the management information.

In step S806, the control unit 211 determines whether the command to stop recording has been multiplexed with the V ancillary of the moving image data input from each of the input units 201 to 204 after starting to record the moving image data. If the command to stop recording has not been multiplexed (NO in step S806), the control unit 211 continues to directly record the moving image data. If the command to stop recording has been multiplexed (YES in step S806), then in step S807, the control unit 211 instructs the recording medium control unit 208 to stop recording the moving image data. The recording medium control unit 208 stops recording the moving image data.

The external recording apparatus 200 records the input moving image data on the recording medium 210 every time it receives the command to start recording from the recording apparatus 100. If each of the frames constituting one clip is recorded as an independent moving image file, all the moving image files constituting the one clip may be stored in one folder when managed. Thus, moving image files in the same clip are stored in one folder. In the case, the recording medium control unit 208 newly generates a folder and stores a moving image file every time it is instructed to start to record a new clip.

Figure 9:
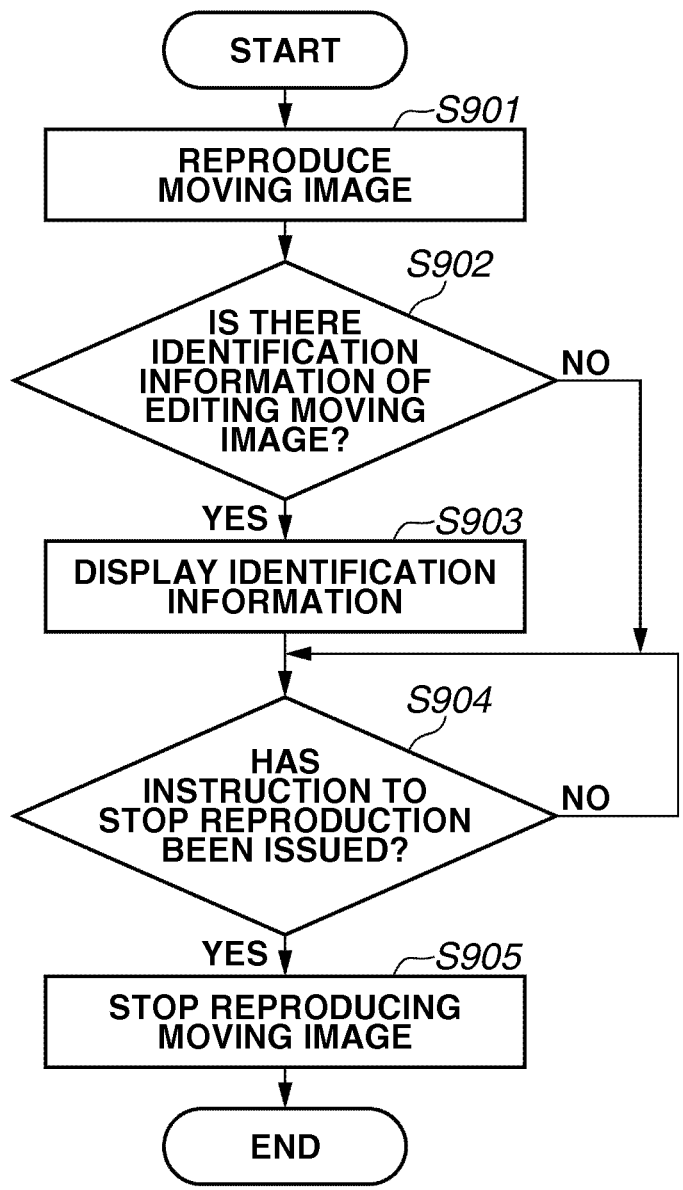
FIG. 9 is a flowchart illustrating a reproduction operation by the external recording apparatus.

Processing during reproduction in the external recording apparatus 200 will be described below. FIG. 9 is a flowchart representing reproduction processing. When the user operates the operation unit 212, to issue an instruction to start reproduction, the control unit 211 instructs the recording medium control unit 208 to reproduce moving image data. The recording medium control unit 208 controls the writing/reading unit 209, to read out the management information recorded on the recording medium 210. In step S901, the control unit 211 reads the moving image data out of the recording medium 210 based on the management information, and stores the read moving image data in the memory 206. The recording medium control unit 208 sends the read management information to the control unit 211. The display control unit 213 reads the moving image data out of the memory 206, converts the number of pixels in each of the frames constituting the moving image data depending on the number of pixels displayed on the display unit 214, and displays the moving image data after the conversion on the display unit 214.

In step S902, the control unit 211 then detects whether the identification information of the editing moving image data is included in the reproduced management information. If the identification information of the editing moving image data is included (YES in step S902), the control unit 211 sends the identification information, e.g., a file name, to the display control unit 213. In step S903, the control unit 211 causes the display control unit 213 to multiplex the file name of the editing moving image data with the reproduced moving image data, and displays a multiplexing result on the display unit 214. The display control unit 213 multiplexes other necessary information with the moving image data, and displays a multiplexing result.

In step S904, the control unit 211 determines whether an instruction to stop reproduction has been issued from the operation unit 213. If the instruction to stop reproduction has been issued (YES in step S904), then in step S905, the control unit 211 instructs the recording medium control unit 208 to stop reproduction, and stops reproducing the moving image data.

Thus, in the present exemplary embodiment, file names added to a plurality of editing moving image data to be simultaneously recorded are multiplexed as the identification information on the moving image data to be externally output in the external output mode. Therefore, when a recorded moving image is reproduced in the external recording apparatus 200, the corresponding editing moving image data, which have simultaneously been recorded on the recording media 108 and 109 during recording of the moving image, can easily be recognized.

In the present exemplary embodiment, the same file name is added to the editing moving image data, which have simultaneously been recorded on the two recording media 108 and 109, and the file name is multiplexed with the moving image data to be externally output.

Therefore, the user can easily find, even when the user performs editing work using either one of the two editing moving image data, which have been recorded on the recording media 108 and 109, moving image data for reflecting an editing result.

In the present exemplary embodiment, if the file number of the moving image file recorded on one of the recording media 108 and 109 has reached the determined upper-limit value, the editing moving image data has been recorded on the other recording medium. If the file number of the moving image file, which has been recorded on either one of the recording media 108 and 109, reaches the upper-limit value, the editing moving image data may be inhibited from being recorded.

Figure 10:
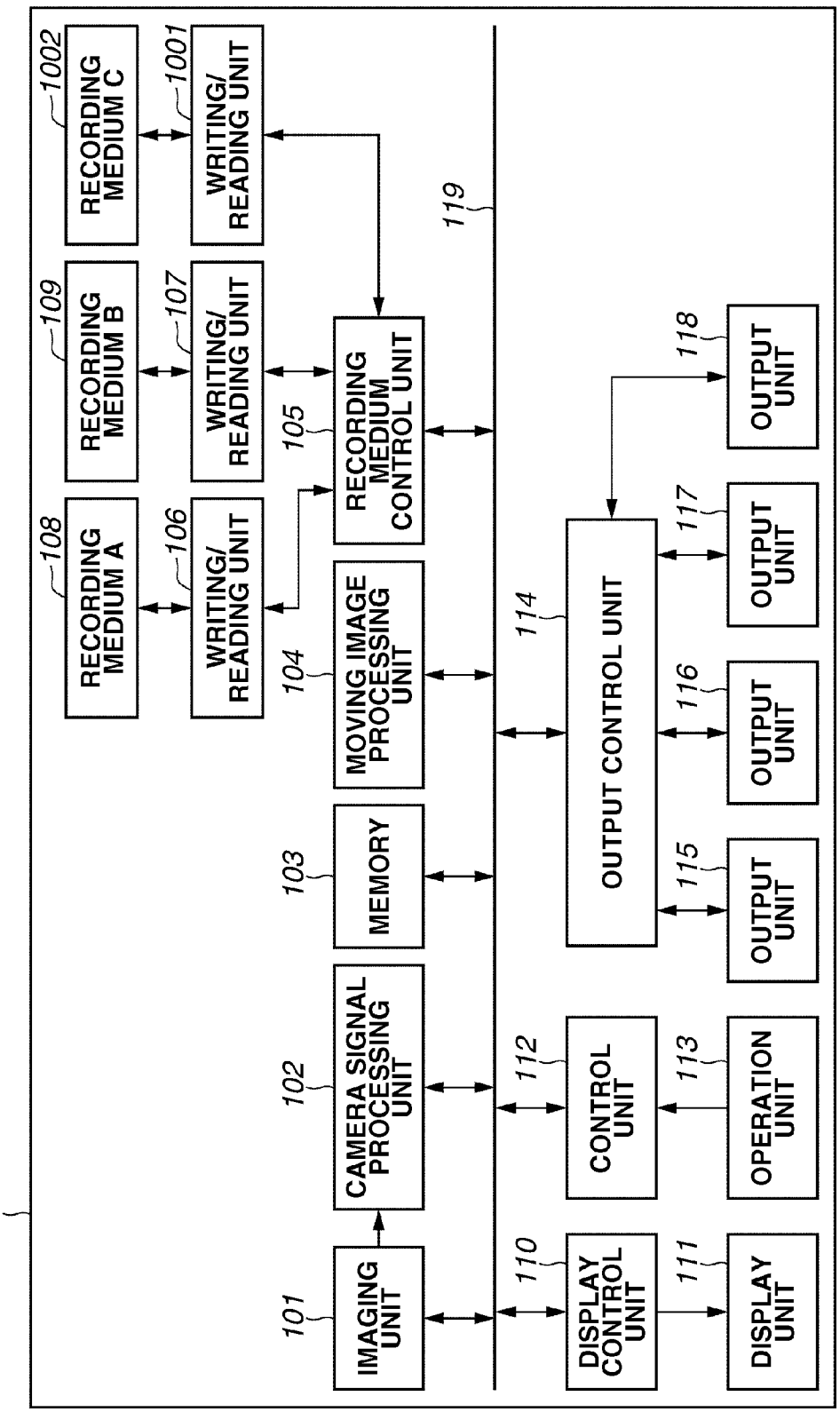
FIG. 10 illustrates a configuration of a recording apparatus according to a second exemplary embodiment.

A second exemplary embodiment will be described below. FIG. 10 illustrates a configuration of a recording apparatus 1000 according to the second exemplary embodiment. In the recording apparatus 1000 illustrated in FIG. 10, the same reference numeral is added to the same constituent element as that illustrated in FIG. 1, and hence detailed description thereof is omitted. In the recording apparatus 1000 illustrated in FIG. 10, a writing/reading unit 1001 and a recording medium C 1002 are added to the configuration illustrated in FIG. 1. The recording apparatus 1000 can simultaneously record moving image data on three recording media 108, 109, and 1002. In an external output mode, editing moving image data can be simultaneously recorded on the three recording media 108, 109, and 1002. A user can select the recording medium, on which the editing moving image data is to be recorded in the external output mode, by operating an operation unit 113. More specifically, the user can select two of the three recording media 108, 109, and 1002 in the external output mode, and simultaneously record the editing moving image data on the selected two recording media.

Figure 11B:
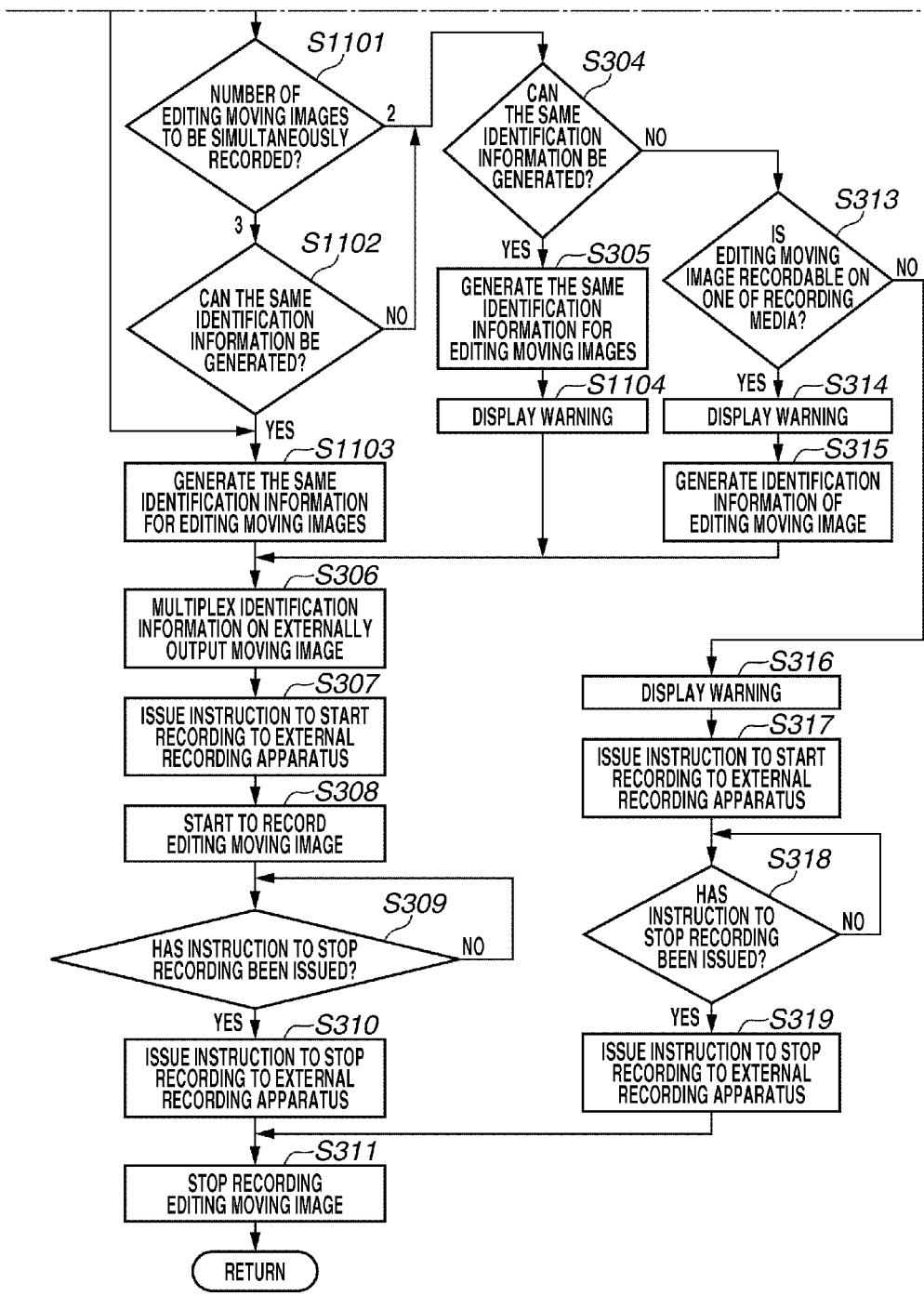
FIG. 11, which is composed of FIGS. 11A and 11B, is a flowchart illustrating an operation in an external output mode in the second exemplary embodiment.

Processing in the external output mode in the recording apparatus 1000 will be described below. FIG. 11, which is composed of FIGS. 11A and 11B, is a flowchart illustrating the processing in the external output mode. In FIG. 11, the same reference numeral is added to each of processing steps common to those illustrated in FIG. 3.

If the external output mode is set when the recording apparatus 1000 is in a recording standby state, then in step S301, a control unit 112 controls each of units so that moving image data of 4K having a designated frame rate is output from each of output units 115 to 118. An output control unit 114 outputs each of moving image data from a corresponding channel in response to setting. In step S302, the control unit 112 then determines whether an instruction to start recording has been issued from the operation unit 113.

If the instruction to start recording has been issued (YES in step S302), then in step S303, the control unit 112 determines whether simultaneous recording of the editing moving image data is set. If the simultaneous recording is not set (NO in step S303), then in step S312, the control unit 112 generates identification information of the editing moving image data.

If the simultaneous recording is set (YES in step S303), then in step S1101, the control unit 112 detects the number of editing moving image data to be simultaneously recorded. If the number of editing moving image data to be simultaneously recorded is three, then in step S1102, the control unit 112 confirms whether the same identification information can be generated for the editing moving image data to be simultaneously recorded on the three recording media 108, 109, and 1002.

FIGS. 12A to 12C illustrate the identification information of the editing moving image data to be generated by the control unit 112. In an example illustrated in FIG. 12A, for example, maximum values of file numbers added to the moving image files, which have already been recorded, respectively, on the recording medium A 108, the recording medium B 109, and the recording medium C 1002, are respectively 10, 15, and 20.

Therefore, in a normal recording mode, 11, 16, and 21 are respectively added as file numbers to moving image files to be next recorded on the recording medium A 108, the recording medium B 109, and the recording medium C 1002. On the other hand, if the number of editing moving image data to be simultaneously recorded is three in the external output mode, 21 obtained by adding one to 20 serving as a maximum value of the file numbers added to the moving image files, which have already been recorded on the recording medium A 108, the recording medium B 109, and the recording medium C 1002, is added as a file number.

If the same identification information can thus be recorded on the editing moving image data to be recorded on the three recording media 108, 109, and 1002 (YES in step S1102), then in step S1103, the control unit 112 generates the same identification information for the editing moving image data to be recorded on the three recording media 108, 109, and 1002.

If the number of the editing moving image data to be simultaneously recorded is two in step S1101, and if the same identification information cannot be generated for the three recording media 108, 109, and 1002 (NO in step S1102), then in step S304, the control unit 112 determines whether the same identification information can be generated for the editing moving image data to be simultaneously recorded on the two recording media.

In an example illustrated in FIG. 12B, for example, a maximum value of file numbers added to a moving image file, which has already been recorded on the recording medium C 1002, is 9999. Therefore, a moving image file having a file number exceeding the maximum value added thereto cannot be recorded on the recording medium C 1002. Thus, a new moving image file is inhibited from being recorded on the recording medium C 1002.

If the same identification information cannot be generated for the three recording media 108, 109, and 1002 (NO in step S1102), then in step S304, the control unit 112 determines whether the same identification information can be generated for two of the three recording media 108, 109, and 1002. In FIG. 12B, maximum values of file numbers added to moving image files, which have already been recorded on the recording medium A 108 and the recording medium B 109, do not reach an upper-limit value. Therefore, the same file number 16 is generated as respective file numbers of the moving image files to be recorded on the two recording media.

If the number of editing moving image data to be simultaneously recorded is two in step S1101, the control unit 112 determines whether the same identification information can be generated for the two recording media selected by the user. If the recording medium A 108 and the recording medium B 109 are selected in FIG. 12B, the same file number 16 is generated as the respective file numbers of the moving image files to be recorded on the two recording media 108 and 109. If the recording medium A 108 and the recording medium C 1002 or the recording medium B 109 and the recording medium C 1002 are selected, the moving image file having the file number exceeding the maximum value added thereto cannot be recorded on the recording medium C 1002. Therefore, the same identification information cannot be generated.

If it is determined that the same file number can be added to the moving image files to be recorded on the two recording media (YES in step S304), then in step S305, the control unit 112 generates the same file number for the two recording media, as described above. In step S1104, the control unit 112 displays on the display unit 111 information indicating that the number of editing moving image data to be simultaneously recorded is two.

If the same identification information cannot be generated (NO in step S304), then in step S313, the control unit 112 determines whether the editing moving image data can be recorded on any one of the three recording media 108, 109, and 1002. If a maximum value of file numbers added to moving image files, which have been recorded on two of the three recording media 108, 109, and 1002 is the upper-limit value, for example, the editing moving image data is recorded on the remaining one recording medium. If the editing moving image data can be recorded (YES in step S313), then in S314, the control unit 112 displays on the display unit 111 information indicating that simultaneous recording is inhibited to record the editing moving image data on one of the recording media, e.g., the recording medium A 108. In step S315, the control unit 112 generates the identification information of the editing moving image data, as described above, based on the file number of the moving image file that has been recorded on the one recording medium.

If one or more pieces of editing moving image data are thus recorded, then in step S306, the control unit 112 sends the identification information of the editing moving image data to the output control unit 114, and instructs the output control unit 114 to multiplex the identification information with the moving image data output from each of the output units 115 to 118. In step S307, the control unit 112 instructs the output control unit 114 to multiplex command data representing a command to start recording with the moving image data output from each of the output units 115 to 118. The output control unit 114 multiplexes the identification information of the editing moving image data and the command data representing a command to start recording with the output moving image data, and outputs a multiplexing result to each of the output units 115 to 118.

In step S308, the control unit 112 then starts to record the editing moving image data. If the simultaneous recording is set (YES in step S303), the control unit 112 simultaneously records the editing moving image data on the selected recording media. The control unit 112 instructs the recording medium control unit 105 to add the same file number to the moving image files to be recorded on the recording media 108, 109, and 1002. In step S309, the control unit 112 then determines whether an instruction to stop recording has been issued from the operation unit 113. If the instruction to stop recording has been issued (YES in step S309), then in step S310, the control unit 112 instructs the output control unit 114 to multiplex command data representing a command to stop recording with the moving image data output from each of the output units 115 to 118. The output control unit 114 multiplexes the command data representing a command to stop recording with the output moving image data, and outputs a multiplexing result to each of the output units 115 to 118.

In step S311, the control unit 112 then instructs the recording medium control unit 105 to stop recording the editing moving image data. The recording medium control unit 105 instructs the writing/reading units 106 and 107 to stop recording the editing moving image data.

As illustrated in FIG. 12C, if the maximum value of the file number is the upper-limit value in any of the recording media 108, 109, and 1002, the control unit 112 inhibits the editing moving image data from being recorded. In such a case, the control unit 112 determines that the editing moving image data cannot be recorded (NO in step S313), and the processing proceeds to step S316. In step S316, the control unit 112 displays on the display unit 111 warning information indicating that the editing moving image data cannot be recorded.

In step S317, the control unit 112 instructs the output control unit 114 to multiplex the command data representing a command to start recording with the moving image data output from each of the output units 115 to 118. The output control unit 114 multiplexes the identification information of the editing moving image data and the command data representing a command to start recording with the output moving image data, and outputs a multiplexing result to each of the output units 115 to 118.

In step S318, the control unit 112 then determines whether the instruction to stop recording has been issued from the operation unit 113. If the instruction to stop recording has been issued (YES in step S318), then in step S319, the control unit 112 instructs the output control unit 114 to multiplex the command data representing a command to stop recording with the moving image data output from each of the output units 115 to 118. The output control unit 114 multiplexes the command data representing a command to stop recording with the output moving image data, and outputs a multiplexing result to each of the output units 115 to 118.

Thus, in the present exemplary embodiment, the same file number is also added to the three editing moving image data to be simultaneously recorded in the external output mode, and is multiplexed with the moving image data to be externally output when output. Therefore, when a recorded moving image is reproduced in the external recording apparatus 200, a file name of the corresponding editing moving image data, which have simultaneously been recorded on the recording media 108 and 109 during recording of the moving image, can easily be recognized.

While the recording apparatus 1000 records the moving image data on the three recording media 108, 109, and 1002 in the second exemplary embodiment, the moving image data may be simultaneously recordable on three or more recording media. The moving image data can also be output according to a format other than the SDI format. While the moving image data having a smaller number of pixels than that of the moving image data to be externally output is recorded as the editing moving image data, moving image data having a smaller amount of information than that of the moving image data to be externally output can also be the editing moving image data. While the recording apparatus 1000 includes the four output units 115, 116, 117, and 118, and the moving image data is output using the output units on four channels in the present exemplary embodiment, the number of channels is not limited to this. For example, a plurality of channels can be used.

In the first and second exemplary embodiments, the file number is used as the identification information of the editing moving image data. In a third exemplary embodiment, unique identification information, which is not a file number, is generated, and is added to editing moving image data when recorded while being multiplexed with moving image data to be externally output when output. If the size of a moving image file that is being recorded reaches a determined division threshold value based on an upper-limit size defined by a file system while the editing moving image data is being recorded in the present exemplary embodiment, the moving image file that is being recorded is closed. A moving image file of editing moving image data is newly generated, and recording of the file is continued.

A configuration of a recording apparatus 100 and a configuration of an external recording apparatus 200 in the present exemplary embodiment are similar to those illustrated in FIGS. 1 and 2, and a function relating to recording/reproduction is similar to that in the first exemplary embodiment.

Processing in an external output mode in the present exemplary embodiment will be described below. FIG. 13 is a flowchart illustrating processing of the recording apparatus 100 associated with the external output mode in the third exemplary embodiment.

If the external output mode is set when the recording apparatus 100 is in a recording standby state, then in step S1301, a control unit 112 controls each of units so that moving image data of 4K having a designated frame rate is output from each of output units 115 to 118. An output control unit 114 outputs each of moving image data from a corresponding channel in response to setting. In step S1302, the control unit 112 then determines whether an instruction to start recording has been issued from an operation unit 113.

If the instruction to start recording has been issued (YES in step S1302), then in step S1303, the control unit 112 generates identification information of the editing moving image data. In the present exemplary embodiment, a value, which is increased by a predetermined value every time the instruction to start recording is issued, is used as identification information. If a value of identification information generated during previous recording, for example, is 1, a value 2, which is increased by a predetermined value, e.g., one, is generated during current recording. In addition thereto, identification information can also be generated by combining an individual number of the recording apparatus 100 and hours, minutes, and seconds at the start of recording. In the present exemplary embodiment, common identification information is added to editing moving image data constituting one clip to be recorded from the instruction to start recording to an instruction to stop recording.

In step S1304, the control unit 112 then sends the identification information of the editing moving image data to the output control unit 114, instructs the output control unit 114 to multiplex the identification information on moving image data output from each of the output units 115 to 118, and instructs the output control unit 114 to multiplex command data representing a command to start recording with the moving image data output from each of the output units 115 to 118. The output control unit 114 multiplexes the identification information of the editing moving image data and the command data representing a command to start recording with the output moving image data, and outputs a multiplexing result to each of the output units 115 to 118. In the present exemplary embodiment, the identification information is multiplexed with the moving image data in all frames to be output after the instruction to start recording has been issued.

In step S1305, the control unit 112 then instructs the recording medium control unit 105 to start to record the editing moving image data. In step S1306, the control unit 112 causes the recording medium control unit 105 to newly generate moving image files on recording media 108 and 109 when the instruction to start recording has been issued. In step S1307, the control unit 112 starts to record the editing moving image data. In the present exemplary embodiment, a data rate of the moving image file, which is recordable on each of the recording media 108 and 109, is higher than a data rate of the editing moving image data. Therefore, the coded moving image data is stored once in the memory 103. The recording medium control unit 105 reads, when a data amount of moving image data, which has not been recorded yet, stored in the memory 103 reaches a predetermined amount, the editing moving image data out of the memory 103 and records the read editing moving image data. When the data amount of the moving image data, which has not been recorded yet, stored in the memory 103 decreases to a predetermined value, the recording is stopped. The recording medium control unit 105 sends, when writing is completed once, information about a file size of a moving image file that is being recorded to the control unit 112.

If simultaneous recording is set, the control unit 112 simultaneously records the editing moving image data on the two recording media 108 and 109. The control unit 112 adds the identification information, which has been generated in step S1303, to the moving image file to be recorded on each of the recording media 108 and 109, and records the moving image file having the identification information added thereto.

In step S1308, the control unit 112 then determines whether an instruction to stop recording has been issued from the operation unit 113. If the instruction to stop recording has been issued (YES in step S1308), then in step S1309, the control unit 112 instructs the output control unit 114 to multiplex the command data representing a command to stop recording with the moving image data output from each of the output units 115 to 118. The output control unit 114 multiplexes the command data representing a command to stop recording with the output moving image data, and outputs a multiplexing result to each of the output control units 115 to 118. The control unit 112 instructs the output control unit 114 to stop multiplexing the identification information of the editing moving image data. The output control unit 114 stops multiplexing the identification information of the externally output moving image data, adds invalid data to a multiplexing position of the identification information, and outputs the moving image data having the invalid data added thereto.

The control unit 112 then instructs the recording medium control unit 105 to stop recording the editing moving image data. In step S1310, the control unit 112 causes the recording medium control unit 105 to close a moving image file that is being recorded, and stop recording the editing moving image data.

If the instruction to stop recording has not been issued (NO in step S1308), then in step S1311, the control unit 112 determines whether the size of the moving image file that is being recorded has reached a file division threshold value. If the size of the moving image file that is being recorded has not reached the threshold value (NO in step S1311), the recording is continued. If the size of the moving image file that is being recorded has reached the threshold value (YES in step S1311), then in step S1312, the control unit 112 instructs the recording medium control unit 105 to close the moving image file that is being recorded and newly generate a moving image file. The recording medium control unit 105 closes the moving image files that are being recorded on the recording media 108 and 109, and the processing returns to step S1306. In step S1306, the control unit 112 causes the recording medium control unit 105 to newly generate a moving image file and continue to record the editing moving image data. At this time, the identification information, which has been generated in step S1303, is also added to the moving image file newly generated.

According to the present exemplary embodiment, the identification information added to the one or more editing moving image data to be simultaneously recorded are thus multiplexed with moving image data to be externally output when output in the external output mode. When the recorded moving image data is reproduced in the external recording apparatus 200, therefore, the corresponding editing moving image data, which are simultaneously recorded on the recording media 108 and 109 during recording of the moving image data, can easily be recognized.

In the present exemplary embodiment, the common identification information is added to the plurality of moving image files constituting one clip to be recorded from the start of recording to the stop of recording. Even if the plurality of moving image files is generated during one recording operation, therefore, moving image files of the plurality of editing moving image data constituting the same clip, corresponding to the moving image data recorded on the external recording apparatus 200, can easily be recognized.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178057 filed Aug. 10, 2012, which is hereby incorporated by reference herein in its entirety.

What is claimed is:
1. A recording apparatus comprising:
 a generation unit configured to generate first moving image data and second moving image data corresponding to the first moving image data and having a smaller amount of data than that of the first moving image data;
 an output unit configured to output the first moving image data generated by the generation unit to an external apparatus;
 a recording unit configured to record on a recording medium the second moving image data generated by the generation unit as a moving image file while the first moving image data is output by the output unit; and
 wherein the second moving image data of one clip is recorded from a recording start instruction to a recording stop instruction;
 a control unit configured to generate identification information for identifying the clip and to add the identification information to the moving image file including the second moving image data of the clip,
 wherein the control unit generates the identification information having different value for each of a plurality of clips, and
 wherein the control unit adds the identification information having a first predetermined value for identifying a first clip to each of a plurality of moving image files including the second moving image data of the first clip and controls the output unit to add the identification information having the first predetermined value to the first moving image data being output while the second moving image data of the first clip is recorded, wherein the output unit outputs the first moving image data in accordance with Serial Digital Interface format, and the control unit controls the output unit to add the identification information to a predetermined line in a V-ancillary of the first moving image data.

2. The recording apparatus according to claim 1, wherein if a file size of the moving image file being recorded reaches a threshold, the recording unit closes the moving image file that is being recorded, generate a new moving image file, and continue to record the second moving image data.

3. The recording apparatus according to claim 1, wherein the control unit is configured to control the output unit to add the identification information to each of a plurality of frames constituting the first moving image data to be output by the output unit.

4. The recording apparatus according to claim 3, wherein the control unit controls the output unit to add the identification information to the first moving image data in accordance with the recording start instruction.

5. A recording control method comprising:

generating first moving image data and second moving image data corresponding to the first moving image data and having a smaller amount of data than that of the first moving image data;

outputting the generated first moving image data to an external apparatus;

recording on a recording medium the generated second moving image data as a moving image file while the first moving image data is outputted, wherein the second moving image data of one clip is recorded from a recording start instruction to a recording stop instruction;

generating identification information for identifying the clip and adding the identification information to the moving image file including the second moving image data of the clip, wherein the identification information has different value for each of a plurality of clips, and adding the identification information having a first predetermined value for identifying a first clip to each of a plurality of moving image files including the second moving image data of the first clip and adding the identification information having the first predetermined value to the first moving image data being output while the second moving image data of the first clip is recorded, wherein the outputting outputs the first moving image data in accordance with Serial Digital Interface format, and the identification information is added to a predetermined line in a V-ancillary of the first moving image data.

6. The recording control method according to claim 5, further comprising adding the identification information to each of a plurality of frames constituting the first moving image data to be output.

7. The recording control method according to claim 6, further comprising, in response to an instruction to start to record moving image data, adding the identification information to the first moving image data.

8. The recording control method according to claim 5, wherein if a file size of the moving image file being recorded reaches a threshold, the moving image file being recorded is closed and new moving image file is generated to continue recording the second moving image data.

* * * * *